United States Patent
Fukunaga et al.

(10) Patent No.: US 11,028,916 B2
(45) Date of Patent: Jun. 8, 2021

(54) BICYCLE SPROCKET

(71) Applicant: Shimano Inc., Osaka (JP)

(72) Inventors: Yasufumi Fukunaga, Osaka (JP); Tsuyoshi Fukumori, Osaka (JP)

(73) Assignee: Shimano Inc., Osaka (JP)

( * ) Notice: Subject to any disclaimer, the term of this patent is extended or adjusted under 35 U.S.C. 154(b) by 319 days.

(21) Appl. No.: 16/131,965

(22) Filed: Sep. 14, 2018

(65) Prior Publication Data

US 2019/0101204 A1    Apr. 4, 2019

(30) Foreign Application Priority Data

Oct. 3, 2017 (JP) .............................. JP2017-193470

(51) Int. Cl.
*F16H 55/30* (2006.01)
*B62M 9/00* (2006.01)
*B62M 9/12* (2006.01)

(52) U.S. Cl.
CPC ............... *F16H 55/30* (2013.01); *B62M 9/00* (2013.01); *B62M 9/12* (2013.01)

(58) Field of Classification Search
CPC .......... B62M 9/10; B62M 9/12; B62M 9/105; F16H 55/30; F16H 55/08
USPC ....................................................... 474/160
See application file for complete search history.

(56) References Cited

U.S. PATENT DOCUMENTS

| | | | | |
|---|---|---|---|---|
| 5,192,249 A | * | 3/1993 | Nagano ..................... | B62M 9/10 474/160 |
| 5,716,297 A | * | 2/1998 | Bodmer .................... | B62M 9/10 474/160 |
| 6,045,472 A | * | 4/2000 | Sung ........................ | B62M 9/10 474/158 |
| 6,139,456 A | * | 10/2000 | Lii ........................... | B62M 9/10 474/152 |
| 6,340,338 B1 | * | 1/2002 | Kamada ................... | B62M 9/10 474/152 |
| 6,923,741 B2 | * | 8/2005 | Wei .......................... | B62M 9/10 474/152 |

(Continued)

FOREIGN PATENT DOCUMENTS

| | | |
|---|---|---|
| CN | 102673727 A | 9/2012 |
| CN | 104973204 A | 10/2015 |
| JP | 2002-137785 A | 5/2002 |

*Primary Examiner* — Henry Y Liu
(74) *Attorney, Agent, or Firm* — Global IP Counselors, LLP

(57) ABSTRACT

A bicycle sprocket includes a base body, a first sprocket tooth and a shifting initiation tooth. The first sprocket tooth includes a drive surface including a drive surface side tooth tip end portion, a non-drive surface including a non-drive surface side tooth tip end portion and a tooth tip portion connecting the drive surface side tooth tip end portion and the non-drive surface side tooth tip end portion. The non-drive surface extends circumferentially with respect to the rotational center axis from the non-drive surface side tooth tip end portion toward a first surface. The tooth tip portion extends circumferentially in a first direction between the drive surface side tooth tip end portion and the non-drive surface side tooth tip end portion. The non-drive surface extends circumferentially from the non-drive surface side tooth tip end portion in a second direction that is inclined with respect to the first direction.

29 Claims, 9 Drawing Sheets

(56) References Cited

U.S. PATENT DOCUMENTS

| | | | |
|---|---|---|---|
| 7,942,771 B2 * | 5/2011 | Kamada | B62M 9/10 474/160 |
| 8,092,329 B2 * | 1/2012 | Wickliffe | F16H 55/303 474/160 |
| 8,096,908 B2 * | 1/2012 | Oishi | B62M 9/10 474/160 |
| 8,226,511 B2 * | 7/2012 | Kamada | B62M 9/10 474/160 |
| 8,617,015 B2 * | 12/2013 | Wickliffe | B62M 9/10 474/160 |
| 8,882,619 B2 * | 11/2014 | Braedt | B62M 9/10 474/156 |
| 9,297,450 B2 * | 3/2016 | Numata | F16H 55/0873 |
| 9,334,014 B2 * | 5/2016 | Fukunaga | B62M 9/12 |
| 9,376,165 B2 * | 6/2016 | Oishi | B62M 9/10 |
| 9,394,987 B2 * | 7/2016 | Pfeiffer | F16H 55/30 |
| 9,463,844 B2 * | 10/2016 | Fukunaga | B62M 9/10 |
| 9,873,481 B2 * | 1/2018 | Braedt | B62M 9/10 |
| 9,885,409 B1 * | 2/2018 | Fukunaga | B62M 9/10 |
| 9,915,336 B1 * | 3/2018 | Fukunaga | B62M 9/12 |
| 10,358,186 B2 * | 7/2019 | Sugimoto | F16H 55/30 |
| 10,457,353 B2 * | 10/2019 | Kamada | B62M 9/10 |
| 10,507,888 B2 * | 12/2019 | Sugimoto | B62M 1/36 |
| 10,577,051 B2 * | 3/2020 | Fukunaga | F16H 55/30 |
| 10,578,201 B2 * | 3/2020 | Reiter | B62M 1/36 |
| 10,703,439 B2 * | 7/2020 | Fukumori | F16H 55/30 |
| 2006/0154767 A1 * | 7/2006 | Kamada | B62M 9/10 474/160 |
| 2009/0069135 A1 * | 3/2009 | Chiang | B62M 9/10 474/164 |
| 2009/0258740 A1 * | 10/2009 | Valle | B62M 9/10 474/160 |
| 2011/0092327 A1 * | 4/2011 | Oishi | B62M 9/10 474/160 |

* cited by examiner

BICYCLE SPROCKET

CROSS-REFERENCE TO RELATED APPLICATIONS

This application claims priority to Japanese Patent Application No. 2017-193470, filed on Oct. 3, 2017. The entire disclosure of Japanese Patent Application No. 2017-193470 is hereby incorporated herein by reference.

BACKGROUND

Field of the Invention

The present invention generally relates to a bicycle sprocket.

Background Information

Conventional bicycle sprockets are provided to a crank assembly and a rear wheel. A chain is engaged with and wrapped around one of the sprockets in the crank assembly and one of the sprockets in the rear wheel. Each of the sprockets in the crank assembly and those in the rear wheel is provided with a shifting initiation tooth in which the chain starts shifting between adjacent sprockets disposed axially so as to be adjacent to each other during a shifting operation. On example of a bicycle sprocket is disclosed in Japan Laid-Open Patent Application Publication No. 2002-137785.

SUMMARY

The conventional bicycle sprockets are provided with shifting initiation tooth described above. However, it is concerned that the chain unexpectedly shifts between adjacent sprockets disposed axially in a sprocket tooth different from the shifting initiation tooth during a shifting operation. This may result in occurrence of shock during a shifting operation.

The present invention has been produced in view of the aforementioned drawback. It is an object of the present invention to provide a bicycle sprocket that can prevent a chain from shifting between adjacent sprockets in a sprocket tooth different from a shifting initiation tooth, and can reduce shock during a shifting operation.

In accordance with a first aspect of the present invention, a bicycle sprocket comprises a base body, at least one first sprocket tooth and at least one shifting initiation tooth. The base body includes a rotational center axis, a first surface and a second surface. The second surface is disposed on an opposite side of the first surface in an axial direction with respect to the rotational center axis. The at least one first sprocket tooth extends radially outwardly from the base body in a radial direction with respect to the rotational center axis. The at least one shifting initiation tooth extends radially outwardly from the base body in the radial direction. The at least one shifting initiation tooth is different from the at least one first sprocket tooth.

Here, the at least one first sprocket tooth includes a drive surface, a non-drive surface, and a tooth tip portion. The at least one first sprocket tooth further including a boundary between the drive surface and the tooth tip portion being defined by a drive surface side tooth tip end portion, and a boundary between the non-drive surface and the tooth tip portion being defined by a non-drive surface side tooth tip end portion. The tooth tip portion connects the drive surface side tooth tip end portion and the non-drive surface side tooth tip end portion. The non-drive surface extends circumferentially with respect to the rotational center axis from the non-drive surface side tooth tip end portion toward the first surface. The tooth tip portion extends circumferentially with respect to the rotational center axis in a first direction between the drive surface side tooth tip end portion and the non-drive surface side tooth tip end portion. The non-drive surface extends circumferentially with respect to the rotational center axis from the non-drive surface side tooth tip end portion in a second direction that is inclined with respect to the first direction.

In the present bicycle sprocket, as described above, the at least one first sprocket tooth includes the drive surface, the non-drive surface and the tooth tip portion. The tooth tip portion extends circumferentially with respect to the rotational center axis in the first direction between the drive surface side tooth tip end portion and the non-drive surface side tooth tip end portion. The non-drive surface extends circumferentially with respect to the rotational center axis from the non-drive surface side tooth tip end portion toward the first surface. Additionally, the non-drive surface extends circumferentially with respect to the rotational center axis from the non-drive surface side tooth tip end portion in the second direction that is inclined with respect to the first direction in the axial direction.

With this configuration, by the non-drive surface extending in the second direction that is inclined with respect to the first direction, it is inhibited that the chain engages with the at least one first sprocket tooth. Therefore, the chain is prevented from starting to shift between adjacent sprockets in a sprocket tooth different from the at least one shifting initiation tooth, and thereby shock can be reduced during a shifting operation. Specifically, in an upshifting motion in which the chain shifts to the bicycle sprocket from a small sprocket disposed adjacently to the bicycle sprocket, the chain is prevented from being firstly engaged with the at least one first sprocket tooth of the bicycle sprocket due to the non-drive surface extending toward the first surface.

In accordance with a second aspect of the present invention, the bicycle sprocket according to the first aspect is configured so that the first surface is a center plane facing surface that faces a bicycle center plane of a bicycle in a state in which the base body is attached to the bicycle.

With this configuration, in the upshifting operation in which the chain shifts from a small sprocket to a large sprocket, the chain is restricted from being engaged with the at least first sprocket tooth of the large sprocket by the non-drive surface extending toward the first surface disposed on the bicycle center plane side. In other words, the chain is prevented from shifting between adjacent sprockets in a sprocket tooth different from the at least one shifting initiation tooth, and thereby, shock can be reduced during the shifting operation.

In accordance with a third aspect of the present invention, the bicycle sprocket according to the first or second aspect is configured so that the at least one first sprocket tooth includes a plurality of first sprocket teeth.

With this configuration, the chain is prevented from starting to shift between adjacent sprockets in a sprocket tooth different from the at least one shifting initiation tooth, and thereby, shock can be reduced during the shifting operation.

In accordance with a fourth aspect of the present invention, the bicycle sprocket according to any one of the first to third aspects is configured so that the non-drive surface includes a non-drive surface protrusion. The non-drive surface extends circumferentially toward the first surface at least between the non-drive surface side tooth tip end portion and the non-drive surface protrusion.

With this configuration, the chain is prevented from starting to shift between adjacent sprockets in a sprocket tooth different from the at least one shifting initiation tooth, and thereby, shock can be more efficiently reduced during the shifting operation.

In accordance with a fifth aspect of the present invention, the bicycle sprocket according to the fourth aspect is configured so that the non-drive surface protrusion is disposed radially inwardly from the non-drive surface side tooth tip end portion in the radial direction.

With this configuration, the chain is prevented from starting to shift between adjacent sprockets in a sprocket tooth different from the at least one shifting initiation tooth, and thereby, shock can be more efficiently reduced during the shifting operation.

In accordance with a sixth aspect of the present invention, the bicycle sprocket according to the fifth aspect is configured so that the non-drive surface protrusion is disposed radially inwardly from the non-drive surface side tooth tip end portion by 1 mm or greater in the radial direction.

With this configuration, the chain is prevented from starting to shift between adjacent sprockets, in a sprocket tooth different from the at least one shifting initiation tooth, and thereby, shock can be more efficiently reduced during the shifting operation.

In accordance with a seventh aspect of the present invention, the bicycle sprocket according to any one of the fourth to sixth aspects is configured so that the tooth tip portion is at least partially disposed on an opposite side of a sprocket center plane from the non-drive surface protrusion with respect to the axial direction. The sprocket center plane divides the base body into halves as viewed in the radial direction toward the rotational center axis.

With this configuration, the chain is prevented from starting to shift between adjacent sprockets in a sprocket tooth different from an upshifting initiation tooth and a downshifting initiation tooth. The upshifting initiation tooth is a tooth of the large sprocket to which the chain starts shifting from the small sprocket, whereas the downshifting initiation tooth is a tooth of the large sprocket from which the chain starts shifting to the small sprocket. Accordingly, shock can be reduced during the upshifting operation and a downshifting operation.

Specifically, in the upshifting operation in which the chain shifts to the bicycle sprocket from a small sprocket disposed adjacently to the bicycle sprocket, the chain is prevented from being firstly engaged with the at least one first sprocket tooth of the bicycle sprocket by the non-drive surface extending toward the first surface.

Furthermore, in the downshifting operation in which the chain shifts from the bicycle sprocket to the small sprocket disposed adjacently to the bicycle sprocket, the chain is prevented from being firstly disengaged from the at least one first sprocket tooth of the bicycle sprocket by the tooth tip portion at least partially disposed on the opposite side of the non-drive surface protrusion in the axial direction with respect to the sprocket center plane dividing the base body into halves.

In accordance with an eighth aspect of the present invention, the bicycle sprocket according to the seventh aspect is configured so that at least most of the tooth tip portion is disposed on the opposite side of the sprocket center plane from the non-drive surface protrusion.

With this configuration, shock can be reliably reduced during the downshifting operation in which the chain shifts from a large sprocket to a small sprocket. Specifically, in the upshifting operation in which the chain shifts to the bicycle sprocket from a small sprocket disposed adjacently to the bicycle sprocket, the chain is prevented from being firstly engaged with the at least one first sprocket tooth of the bicycle sprocket by the non-drive surface extending toward the first surface.

Furthermore, in the downshifting operation in which the chain shifts from the bicycle sprocket to the small sprocket disposed adjacently to the bicycle sprocket, the chain is prevented from being firstly disengaged from the at least one first sprocket tooth of the bicycle sprocket by at least most of the tooth tip portion disposed on the opposite side of the non-drive surface protrusion in the axial direction with respect to the sprocket center plane dividing the base body into halves.

In accordance with a ninth aspect of the present invention, the bicycle sprocket according to any one of the fourth to sixth aspects is configured so that the non-drive surface protrusion is disposed on a first surface side with respect to a sprocket center plane dividing the base body into halves as viewed in the radial direction toward the rotational center axis. The tooth tip portion is at least partially disposed on a second surface side with respect to the sprocket center plane as viewed in the radial direction toward the rotational center axis.

With this configuration, the chain is prevented from starting to shift between adjacent sprockets in a sprocket tooth different from the at least one shifting initiation tooth, and thereby, shock can be more reliably reduced during the shifting operation.

In accordance with a tenth aspect of the present invention, the bicycle sprocket according to the ninth aspect is configured so that the non-drive surface protrusion is disposed on the first surface side with respect to the sprocket center plane. Most of the tooth tip portion is disposed on the second surface side with respect to the sprocket center plane.

With this configuration, shock can be reliably reduced during the downshifting operation in which the chain shifts from a large sprocket to a small sprocket.

In accordance with an eleventh aspect of the present invention, the bicycle sprocket according to any one of the first to tenth aspects is configured so that the drive surface side tooth tip end portion is disposed closer to the second surface than the non-drive surface side tooth tip end portion in the axial direction.

With this configuration, shock can be reliably reduced during the downshifting operation in which the chain shifts from a large sprocket to a small sprocket.

In accordance with a twelfth aspect of the present invention, the bicycle sprocket according to any one of the fourth to eleventh aspects is configured so that the non-drive surface side tooth tip end portion is disposed closer to the second surface than the non-drive surface protrusion in the axial direction.

With this configuration, shock can be reliably reduced during the upshifting operation in which the chain shifts from a small sprocket to a large sprocket and the downshifting operation in which the chain shifts from the large sprocket to the small sprocket.

In accordance with a thirteenth aspect of the present invention, the bicycle sprocket according to any one of the first to twelfth aspects further comprises at least one shifting facilitation area. The at least one first sprocket tooth and the at least one shifting initiation tooth are disposed within the at least one shifting facilitation area.

With this configuration, the chain can be shifted between adjacent sprockets in the at least one shifting initiation tooth disposed within the at least one shifting facilitation area, and thereby, the shifting operation can be reliably performed, and shock can be reliably reduced during the shifting operation.

In accordance with a fourteenth aspect of the present invention, the bicycle sprocket according to any one of the first to thirteenth aspects is configured so that the at least one first sprocket tooth is disposed on an adjacently downstream side of the at least one shifting initiation tooth in a drive rotational direction.

With this configuration, shock can be reliably reduced during the upshifting operation in which the chain shifts from a small sprocket to a large sprocket.

In accordance with a fifteenth aspect of the present invention, the bicycle sprocket according to any one of the first to fourteenth aspects is configured so that the at least one first sprocket tooth includes a recessed portion formed from the second surface toward the first surface.

With this configuration, shock can be reliably reduced during the shifting operation in which the chain shifts from a small sprocket to a large sprocket.

In accordance with a sixteenth aspect of the present invention, the bicycle sprocket according to any one of the first to fifteenth aspects is configured so that the at least one shifting initiation tooth includes a plurality of shifting initiation teeth.

With this configuration, the chain is prevented from starting to shift between adjacent sprockets in a sprocket tooth different from the plurality of shifting initiation teeth, and thereby, shifting operation can be quickly and reliably performed by the plurality of shifting initiation teeth, and shock can be reduced during the shifting operation.

In accordance with a seventeenth aspect of the present invention, the bicycle sprocket according to the thirteenth aspect is configured so that the at least one shifting facilitation area includes a plurality of shifting facilitation areas.

With this configuration, the chain is prevented from starting to shift between adjacent sprockets in a sprocket tooth different from the at least one shifting initiation tooth, and thereby shifting operation can be quickly and reliably performed by the plurality of shifting facilitation areas, and shock can be reduced during the shifting operation.

In accordance with an eighteenth aspect of the present invention, the bicycle sprocket according to any one of the first to seventeenth aspects is configured so that a total number of teeth is greater than or equal to 16.

With this configuration, the chain is prevented from starting to shift between adjacent sprockets in a sprocket tooth different from the at least one shifting initiation tooth, and thereby shock can be more reliably reduced during the shifting operation.

In accordance with a nineteenth aspect of the present invention, the bicycle sprocket according to any one of the first to eighteenth aspects is configured so that the base body further includes a bicycle hub engaging portion.

With this configuration, shock can be reduced during the shifting operation of a bicycle rear sprocket.

In accordance with a twentieth aspect of the present invention, the bicycle sprocket according to any one of the first to nineteenth aspects further comprises at least one second sprocket tooth different from the at least one first sprocket tooth and the at least one shifting initiation tooth. The at least one first sprocket tooth has a circumferential chain engaging width greater than a circumferential chain engaging width of the at least one shifting initiation tooth or a circumferential chain engaging width of the at least one second sprocket tooth, or greater than both the circumferential chain engaging width of the at least one shifting initiation tooth and the circumferential chain engaging width of the at least one second sprocket tooth.

With this configuration, the chain is prevented from starting to shift between adjacent sprockets in a sprocket tooth different from the at least one shifting initiation tooth, and thereby shock can be more reliably reduced during the shifting operation.

In accordance with a twenty-first aspect of the present invention, a bicycle sprocket assembly comprises the at least one bicycle sprocket recited in any one of the first to twentieth aspects and further comprising a sprocket support member to which the at least one bicycle sprocket is attached.

With this configuration, weight-saving of the bicycle sprocket assembly can be achieved.

In accordance with a twenty-second aspect of the present invention, the bicycle sprocket assembly according to the twenty-first aspect is configured to the sprocket support member includes a bicycle hub engaging portion.

With this configuration, shock can be reduced during the shifting operation of a bicycle rear sprocket.

In accordance with a twenty-third aspect of the present invention, a bicycle sprocket comprises a base body, at least one first sprocket tooth and at least one shifting initiation tooth. The base body includes a rotational center axis, a first surface and a second surface that is disposed on an opposite side of the first surface in an axial direction with respect to the rotational center axis. The at least one first sprocket tooth extends radially outwardly from the base body in a radial direction with respect to the rotational center axis. The at least one shifting initiation tooth extends radially outwardly from the base body in the radial direction. The at least one shifting initiation tooth is different from the at least one first sprocket tooth.

Here, the at least one first sprocket tooth includes a drive surface, a non-drive surface, and a tooth tip portion. The at least one first sprocket tooth further including a boundary between the drive surface and the tooth tip portion being defined by a drive surface side tooth tip end portion, and a boundary between the non-drive surface and the tooth tip portion being defined by a non-drive surface side tooth tip end portion. The tooth tip portion connects the drive surface side tooth tip end portion and the non-drive surface side tooth tip end portion.

The non-drive surface includes a non-drive surface protrusion. The non-drive surface extends circumferentially with respect to the rotational center axis toward the first surface at least between the non-drive surface side tooth tip end portion and the non-drive surface protrusion. The non-drive surface protrusion is disposed radially inwardly from the non-drive surface side tooth tip end portion in the radial direction. The tooth tip portion is at least partially disposed on an opposite side of a sprocket center plane from the non-drive surface protrusion with respect to the axial direction. The sprocket center plane divides the base body into halves as viewed in the radial direction toward the rotational center axis.

In the present bicycle sprocket, as described above, the at least one first sprocket tooth includes the drive surface, the non-drive surface and the tooth tip portion. The non-drive surface extends circumferentially with respect to the rotational center axis toward the first surface at least between the non-drive surface side tooth tip end portion and the non-drive surface protrusion. The non-drive surface protrusion is disposed radially inwardly from the non-drive surface side tooth tip end portion in the radial direction. The tooth tip portion is at least partially disposed on the opposite side of the sprocket center plane from the non-drive surface protrusion with respect to the axial direction. The sprocket center plane divides the base body into halves as viewed in the radial direction toward the rotational center axis.

With this configuration, the chain is prevented from starting to shift between adjacent sprockets in a sprocket tooth different from an upshifting initiation tooth and a downshifting initiation tooth. The upshifting initiation tooth is a tooth of the large sprocket to which the chain starts shifting from the small sprocket, whereas the downshifting initiation tooth is a tooth of the large sprocket from which the chain starts shifting to the small sprocket. Accordingly, shock can be reduced during the upshifting operation and the downshifting operation.

Specifically, in the upshifting operation in which the chain shifts to the bicycle sprocket from a small sprocket disposed adjacently to the bicycle sprocket, the chain is prevented from being firstly engaged with the at least one first sprocket tooth of the bicycle sprocket by the non-drive surface extending toward the first surface.

Furthermore, in the downshifting operation in which the chain shifts from the bicycle sprocket to a small sprocket disposed adjacently to the bicycle sprocket, the chain is prevented from being firstly disengaged from the at least one first sprocket tooth of the bicycle sprocket by the tooth tip portion at least partially disposed on the opposite side of the non-drive surface protrusion in the axial direction with respect to the sprocket center plane dividing the base body into halves.

With this, the chain can be prevented from starting to shift between adjacent sprockets in a sprocket tooth different from the at least one shifting initiation tooth.

In accordance with a twenty-fourth aspect of the present invention, the bicycle sprocket according to the twenty-third aspect is configured so that at least most of the tooth tip portion is disposed on the opposite side of the non-drive surface protrusion in the axial direction with respect to the sprocket center plane dividing the base body into halves as viewed in the radial direction toward the rotational center axis.

With this configuration, shock can be more reliably reduced during the upshifting operation and the downshifting operation.

In accordance with a twenty-fifth aspect of the present invention, the bicycle sprocket according to the twenty-third or twenty-fourth aspect further comprises at least one second sprocket tooth different from the at least one first sprocket tooth. The at least one first sprocket tooth has a circumferential chain engaging width greater than a circumferential chain engaging width of the at least one shifting initiation tooth or a circumferential chain engaging width of the at least one second sprocket tooth, or greater than both the circumferential chain engaging width of the at least one shifting initiation tooth and the circumferential chain engaging width of the at least one second sprocket tooth.

With this configuration, the chain can be prevented from starting to shift between adjacent sprockets in a sprocket tooth different from the at least one shifting initiation tooth. Further, thereby, shock can be more reliably reduced during the upshifting operation and the downshifting operation.

In accordance with a twenty-sixth aspect of the present invention, the bicycle sprocket according to any one of the twenty-third to twenty-fifth aspects is configured so that the tooth tip portion extends circumferentially with respect to the rotational center axis in a first direction between the drive surface side tooth tip end portion and the non-drive surface side tooth tip end portion. The non-drive surface extends circumferentially with respect to the rotational center axis from the non-drive surface side tooth tip end portion in a second direction that is inclined with respect to the first direction.

With this configuration, the chain can be prevented from starting to shift between adjacent sprockets in a sprocket tooth different from the at least one shifting initiation tooth. Further, thereby, shock can be more reliably reduced during the upshifting operation and the downshifting operation.

In accordance with a twenty-seventh aspect of the present invention, the bicycle sprocket according to any one of the twenty-third to twenty-sixth is configured so that the first surface is a center plane facing surface that faces a bicycle center plane of a bicycle in a state in which the base body is attached to the bicycle.

With this configuration, a shifting operation can be reliably started at the at least one shifting initiation tooth in both the upshifting direction and the downshifting direction, and thereby, shock can be reduced during the shifting operation.

According to the present invention, in the bicycle sprocket, the chain can be prevented from shifting between adjacent sprockets in a sprocket tooth different from the shifting initiation tooth, and thereby shock can be reduced during the shifting operation.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
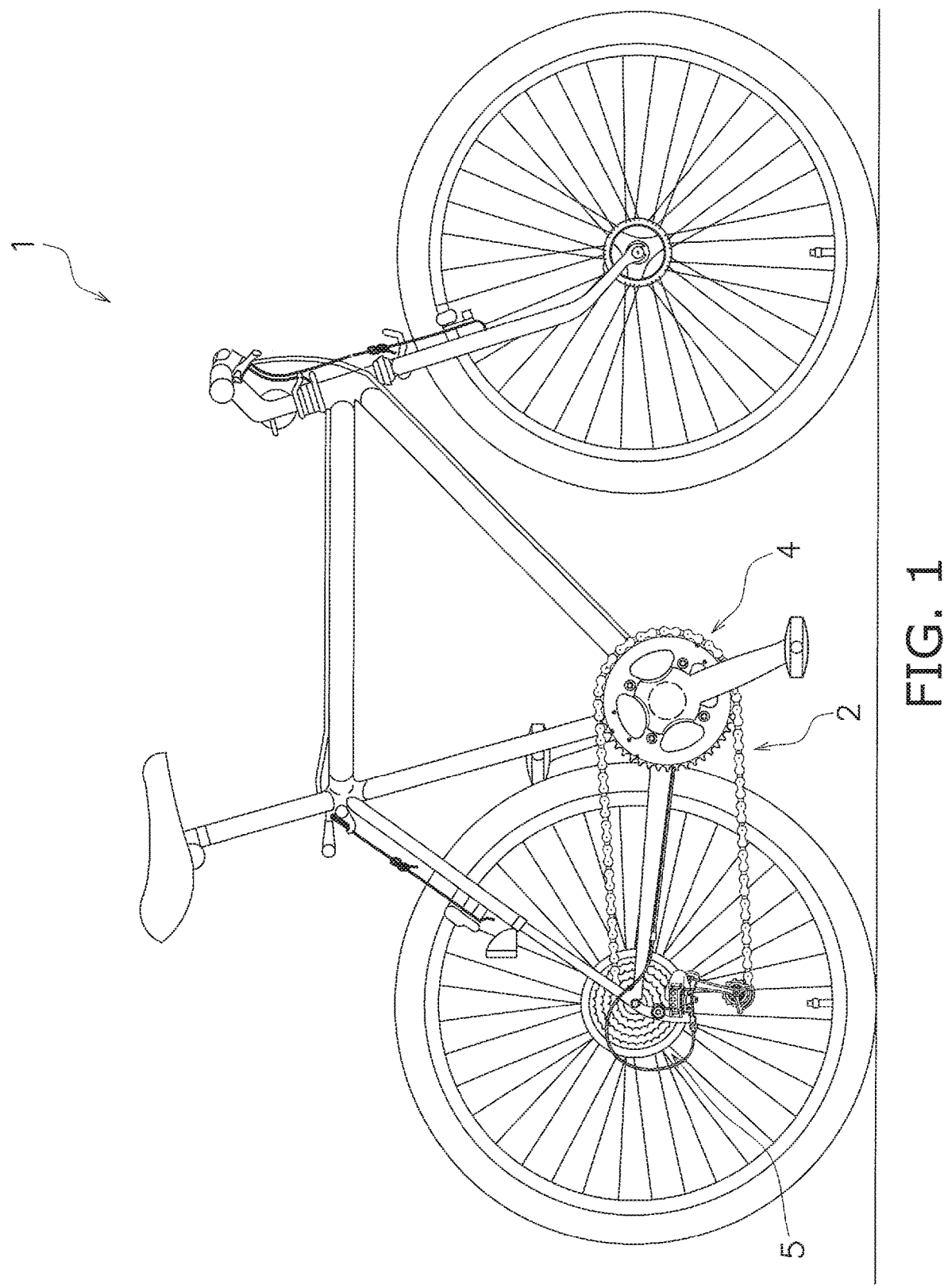
FIG. 1 is a side elevational view of a bicycle having a bicycle sprocket according to one illustrated embodiment.
Figure 2:
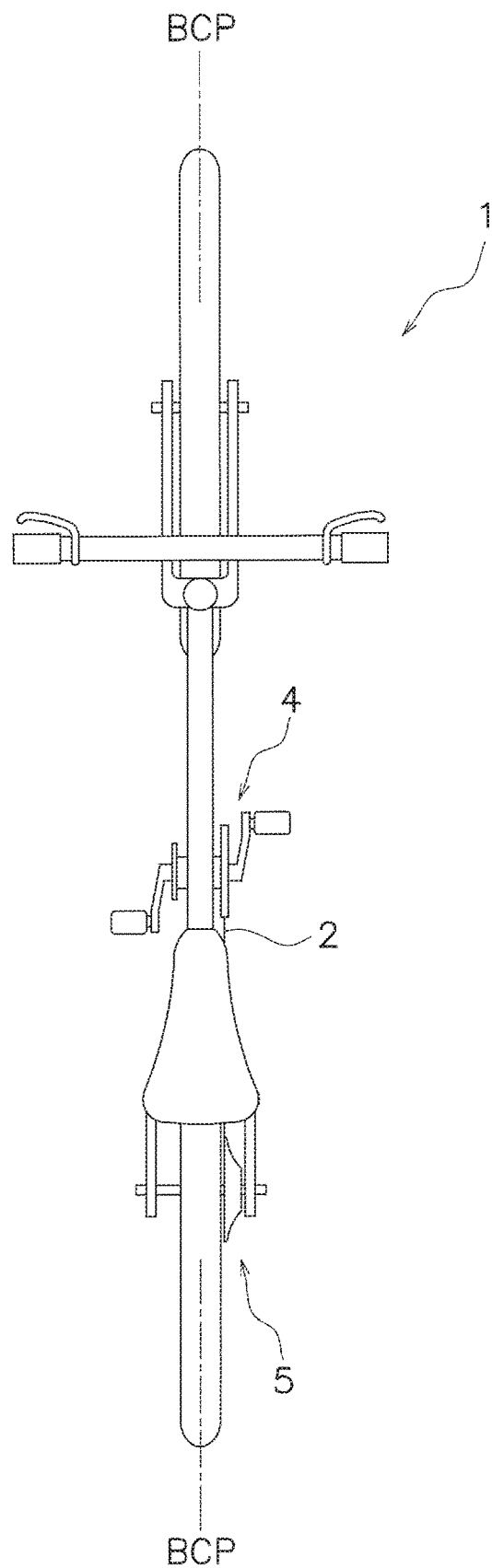
FIG. 2 is a top plan view of the bicycle illustrated in FIG. 1.

As shown in FIGS. 1 and 2, a bicycle 1 according to one embodiment includes a front sprocket assembly 4 and a rear sprocket assembly 5. The front sprocket assembly 4, the rear sprocket assembly 5 and a chain 2 constitute a drive part. The chain 2 is wrapped around the front sprocket assembly 4 and the rear sprocket assembly 5.

Figure 3:
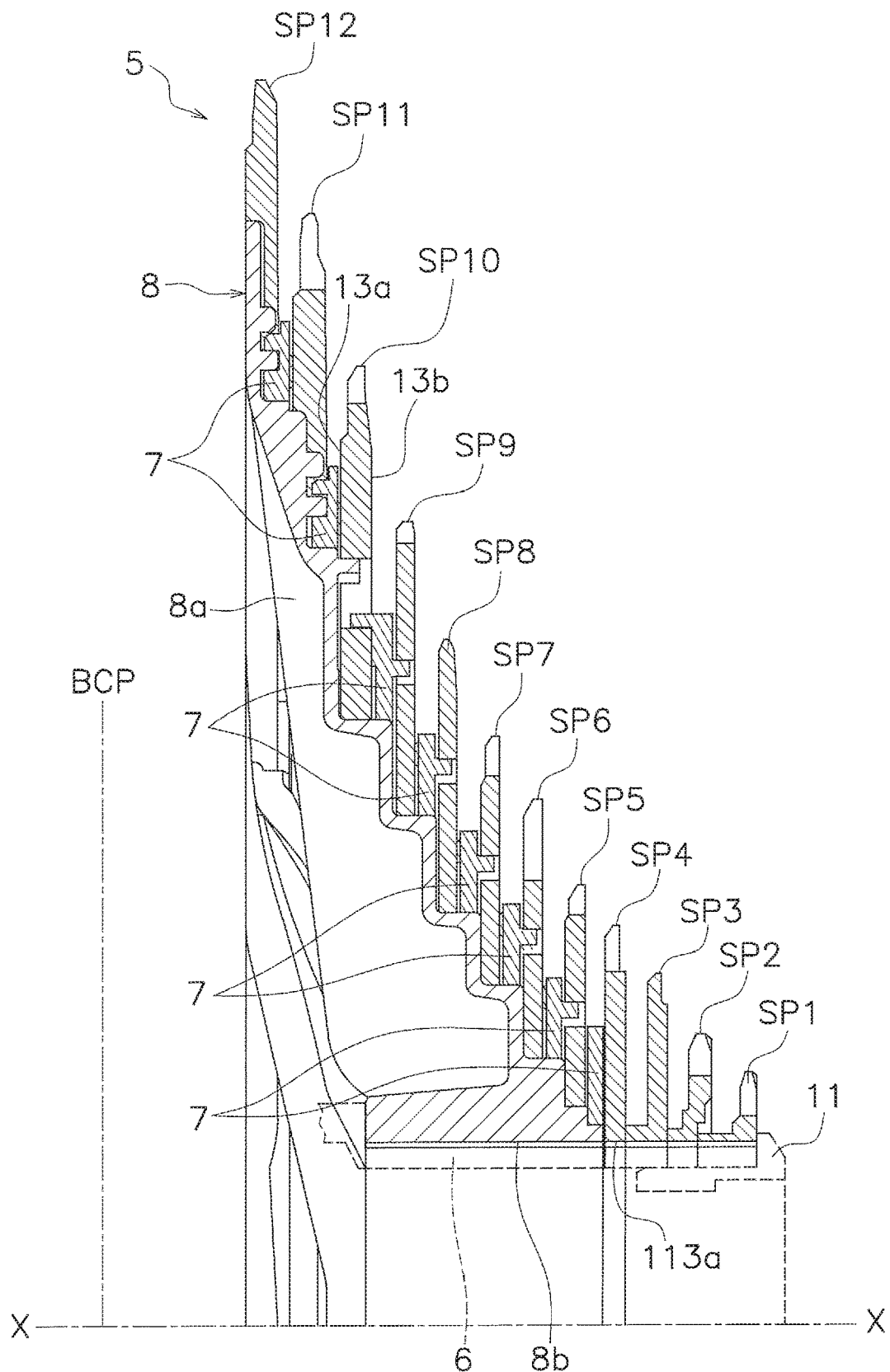
FIG. 3 is a partial cross-sectional view of a rear sprocket assembly of the bicycle illustrated in FIG. 1.

A driving force from the front sprocket assembly 4 is transmitted to the rear sprocket assembly 5 through the chain 2. As shown in FIG. 3, the rear sprocket assembly 5 is attached to a rear hub 6, which is rotatable with respect to a frame 3, so as to be unitarily rotatable therewith. Specifically, the rear sprocket assembly 5 is attached to the rear hub 6 through fixing means such as a lock nut 11 so as to be unitarily rotatable therewith.

As shown in FIG. 3, the rear sprocket assembly 5 includes at least one rear sprocket SP1 to SP12 (exemplary bicycle sprocket) and a sprocket support member 8 to which the at least one rear sprocket SP1 to SP12 is attached.

The rear sprocket assembly 5 herein includes a plurality of rear sprockets SP1 to SP12 (exemplary bicycle sprockets) and the sprocket support member 8. The rear sprocket assembly 5 further includes a plurality of spacers 7.

The rear sprockets SP1 to SP12 are disposed axially in alignment with each other. Each of the spacers 7 is disposed between each axially adjacent pair of the rear sprockets SP1 to SP12 and defines an axial distance between the axially adjacent pairs of the rear sprockets SP1 to SP12.

Figure 4:
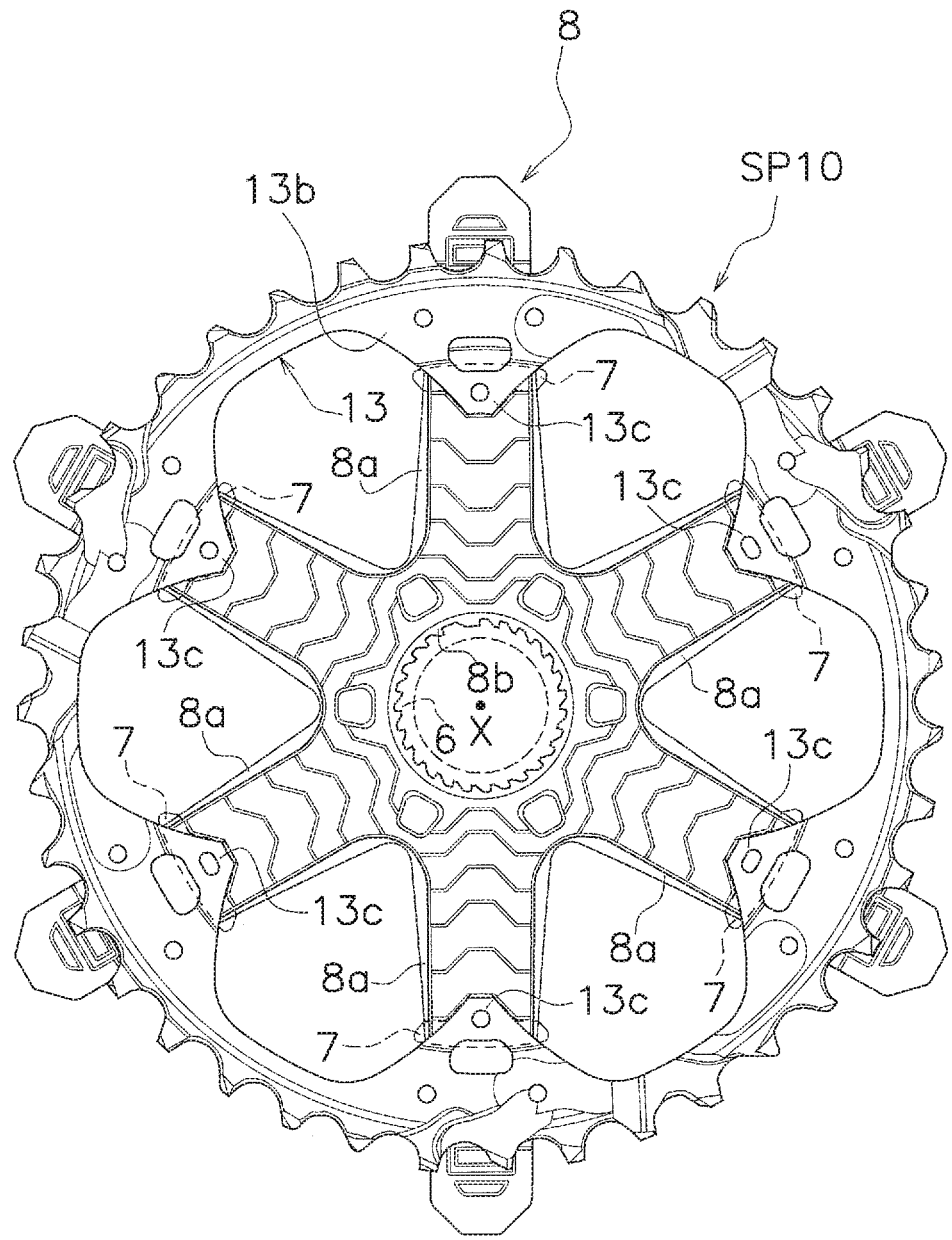
FIG. 4 is a side elevational view of a rear sprocket in a state in which the rear sprocket is attached to a sprocket support member of the rear sprocket assembly illustrated in FIG. 3.

As shown in FIGS. 3 and 4, the sprocket support member 8 includes a plurality of (e.g., six) arm portions 8a supporting the rear sprockets SP5 to SP12. The rear sprockets SP5 to SP12 are fixed to each of the arm portions 8a. Specifically, the rear sprockets SP5 to SP12 are fixed to each of the arm portions 8a through the spacers 7.

As shown in FIGS. 3 and 4, the sprocket support member 8 includes a hub engaging portion 8b to be engaged with a bicycle hub. The hub engaging portion 8b is herein engaged with the rear hub 6 so as to be unitarily rotatable therewith. For example, the hub engaging portion 8b has a substantially tubular shape. The rear hub 6 is disposed in the inner periphery of the hub engaging portion 8b. The hub engaging portion 8b is engaged with the rear hub 6 by, for instance, spline coupling.

A configuration of one embodiment will be hereinafter explained with reference to the rear sprocket SP10 that is one of the rear sprockets SP1 to SP12. It will be apparent from this disclosure that certain sprocket teeth features of the rear sprocket SP10 are also used in the sprockets SP1 to SP9, SP11 and SP12.

Figure 5:
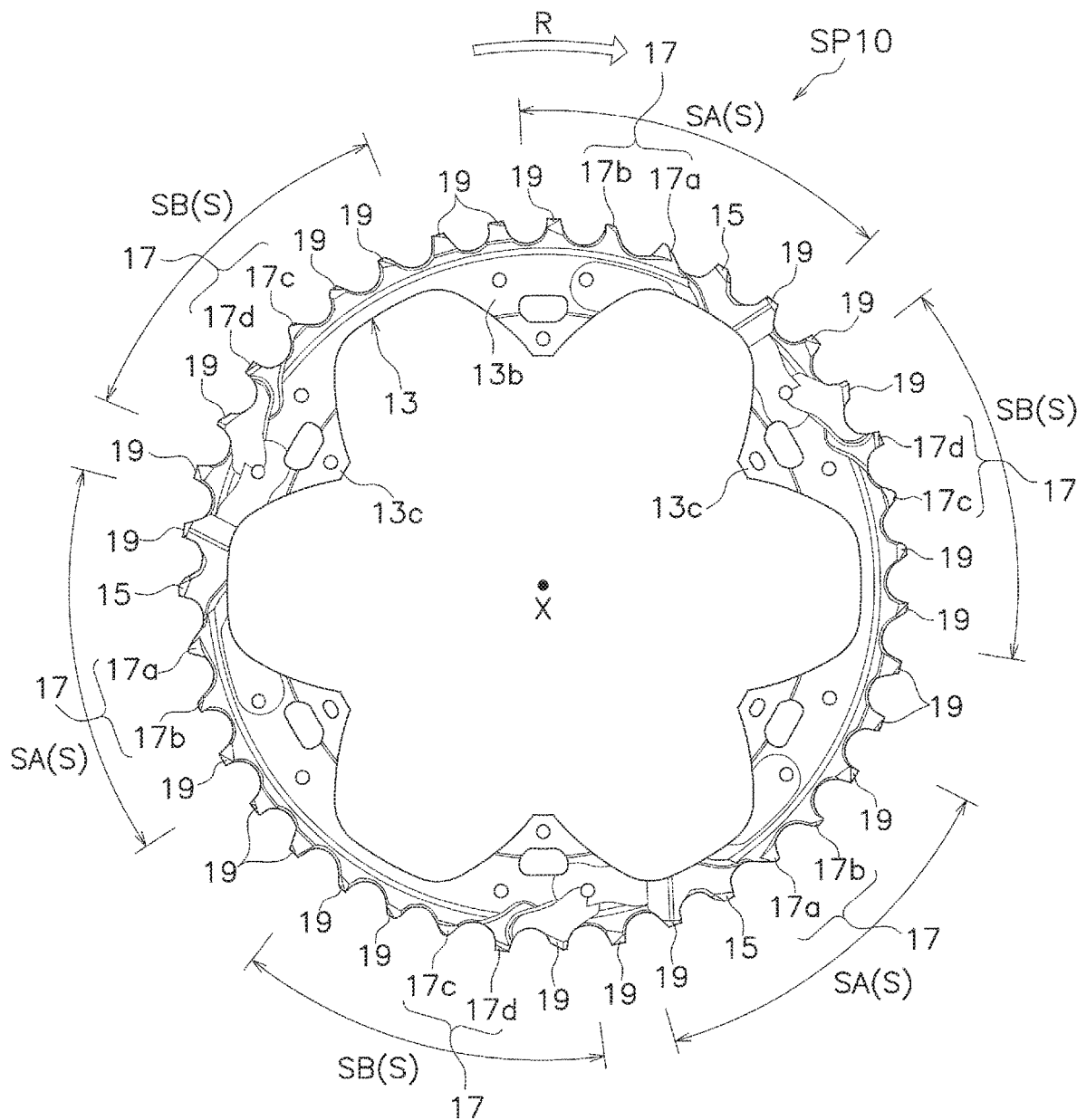
FIG. 5 is a non-center plane facing side view of the rear sprocket illustrated in FIG. 4.
Figure 6:
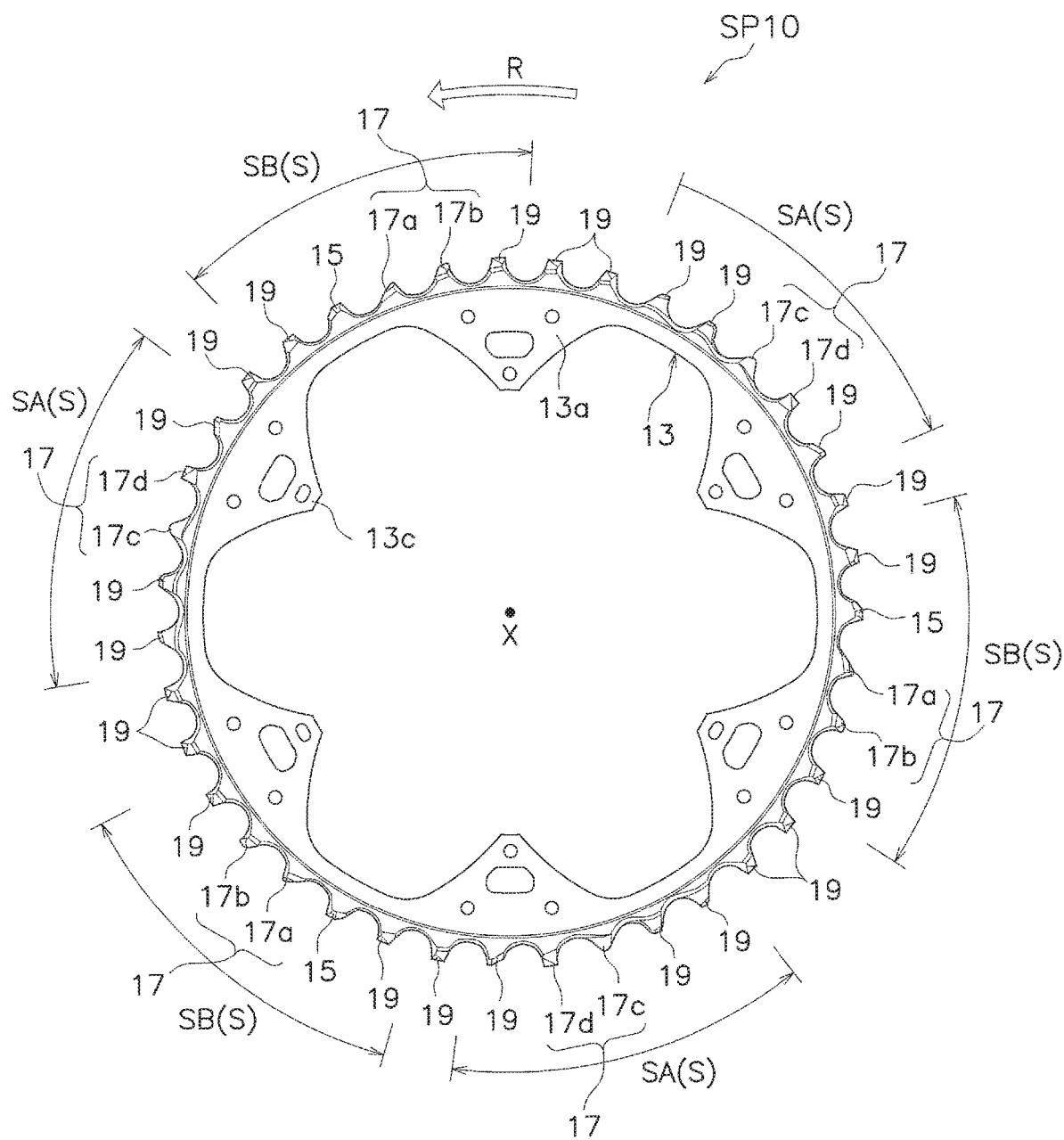
FIG. 6 is a center plane facing side view of the rear sprocket illustrated in FIGS. 4 and 5.

FIGS. 4 to 6 show the rear sprocket SP10 as an exemplary sprocket. As shown in FIGS. 5 and 6, the rear sprocket SP10 includes a base body 13, at least one first sprocket tooth 15 and at least one shifting initiation tooth 17. Preferably, the rear sprocket SP10 further includes at least one second sprocket tooth 19 that is different from the at least one first sprocket tooth 15 and the at least one shifting initiation tooth 17. The rear sprocket SP10 further includes at least one shifting facilitation area S (SA, SB). The total number of teeth of the rear sprocket SP10 is greater than or equal to 16. The total number of teeth of the rear sprocket SP10 shown in FIGS. 4 to 6 is set to be, for instance, 39. However, the number of teeth of a sprocket with this configuration is not limited to the illustrated number of teeth. For example, the rear sprockets SP2 to SP9, SP11 and S12 each includes a base body, at least one first sprocket tooth having the same configuration as the first sprocket tooth 15 but smaller or larger in size, and at least one shifting initiation tooth having the same configuration as the shifting initiation tooth 17 but smaller or larger in size.

The base body 13 is attached to the rear hub 6 through the sprocket support member 8. As shown in FIGS. 5 and 6, the base body 13 has a substantially annular plate shape. The base body 13 includes a rotational center axis X, a first surface 13a and a second surface 13b. The second surface 13b is disposed on the opposite side of the first surface 13a in an axial direction with respect to the rotational center axis X. The base body 13 includes at least one attachment portion 13c that is fixed to the sprocket support member 8. The rotational center axis X is the same for both the rear sprocket assembly 5 and the rear hub 6 (not shown in the drawings).

The rear sprocket SP10 is herein attached to the rear hub 6 through the hub engaging portion 8b (see FIG. 3) of the sprocket support member 8. Therefore, the present embodiment is an example that the rear sprocket SP10 indirectly includes the hub engaging portion 8b. The rear sprockets SP5 to SP9, SP11 and SP12 each have a base body that is attached to the rear hub 6 through the hub engaging portion 8b (see FIG. 3) of the sprocket support member 8.

In the present embodiment, as shown in FIG. 3, the first surface 13a is a surface that is disposed closer to a bicycle center plane in a state in which the base body 13 is attached to the bicycle 1. The bicycle center plane as used herein refers to a vertical plane that bisects the bicycle 1 in a forward to rearward direction of the bicycle 1. The second surface 13b is a surface disposed farther away from the bicycle center plane BCP than the first surface 13a. The first surface 13a is a bicycle center plane facing surface that faces the bicycle center plane BCP in the state in which the base body 13 is attached to the bicycle 1. The second surface 13b is opposed to the rear sprocket SP9 having a smaller diameter than the rear sprocket SP10 in the state in which the base body 13 is attached to the bicycle 1.

As shown in FIG. 4, the at least one attachment portion 13c is fixed to the sprocket support member 8. Here, a plurality of (e.g., six) attachment portions 13c are fixed to the sprocket support member 8, for instance, by the arm portions 8a, respectively. The attachment portions 13c are herein fixed to the arm portions 8a, respectively, so as to be unitarily rotatable therewith. Specifically, the attachment portions 13c are fixed to the arm portions 8a through the spacers 7, respectively, so as to be unitarily rotatable therewith.

The respective attachment portions 13c are provided on the inner peripheral part of the base body 13. The respective attachment portions 13c preferably protrude radially inwardly from the base body 13. The respective attachment portions 13c are circumferentially disposed at intervals from each other.

Figure 9:
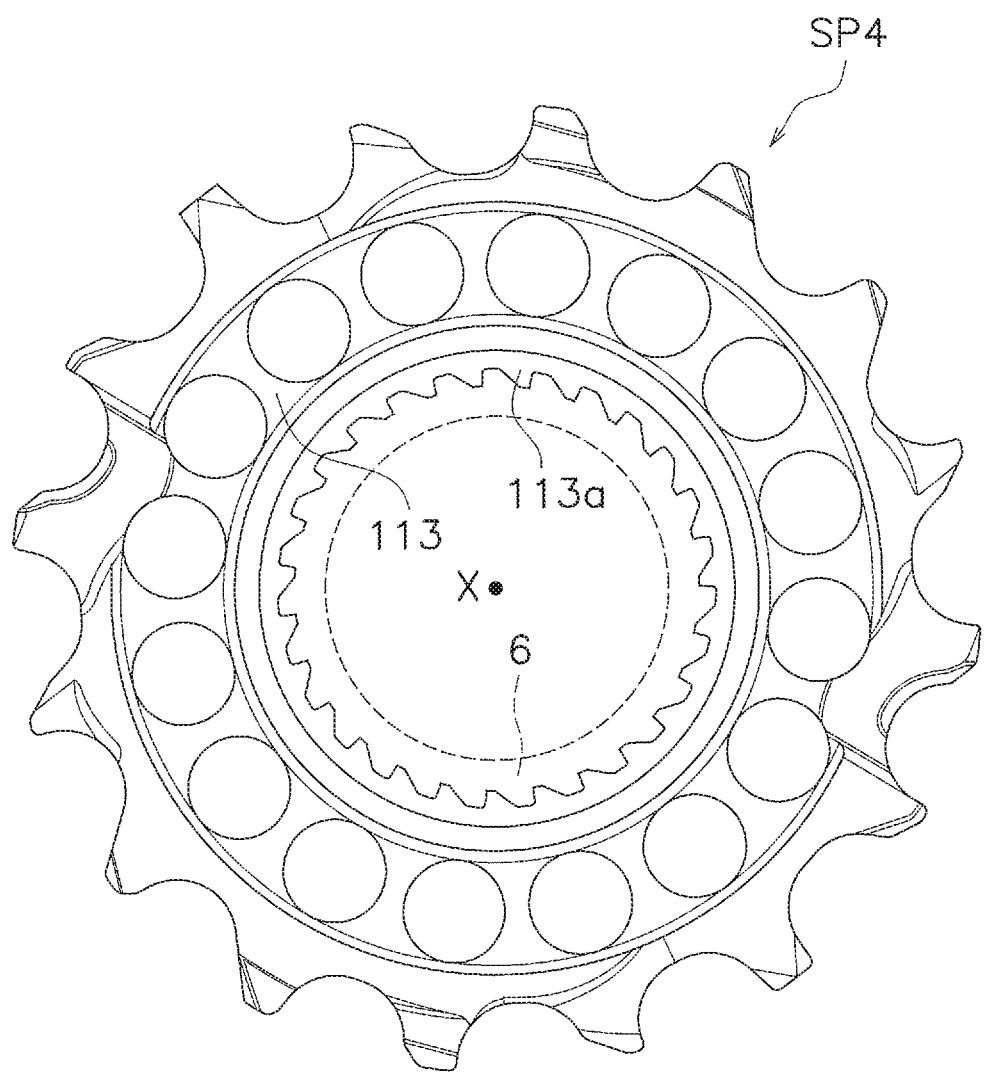
FIG. 9 is a non-center plane facing side view of another rear sprocket.

It should be noted that as shown in FIG. 9, each of the base bodies of the rear sprockets SP1 to SP4, for instance, a base body 113 of the rear sprocket SP4, directly includes a hub engaging portion 113a to be engaged with the rear hub 6. The hub engaging portion 113a is herein engaged with the rear hub 6 so as to be unitarily rotatable therewith (see FIG. 3).

The hub engaging portion 113a is provided on the inner peripheral part of the annular base body 113. As shown in FIG. 3, the rear hub 6 is disposed in the inner periphery of the hub engaging portion 113a. The hub engaging portion 113a is directly engaged with the rear hub 6 by, for instance, spline coupling. Therefore, a rear sprocket such as the sprocket SP4 enables the base body thereof to include a bicycle hub engaging portion to be directly or indirectly engaged with a bicycle hub.

As shown in FIGS. 5 and 6, the at least one first sprocket tooth 15 is preferably disposed within the at least one shifting facilitation area S. The at least one first sprocket tooth 15 extends radially outwardly from the base body 13 in a radial direction with respect to the rotational center axis X. The at least one first sprocket tooth 15 is preferably disposed on an adjacently downstream side of the at least one shifting initiation tooth 17 in a drive rotational direction R.

Figure 7:
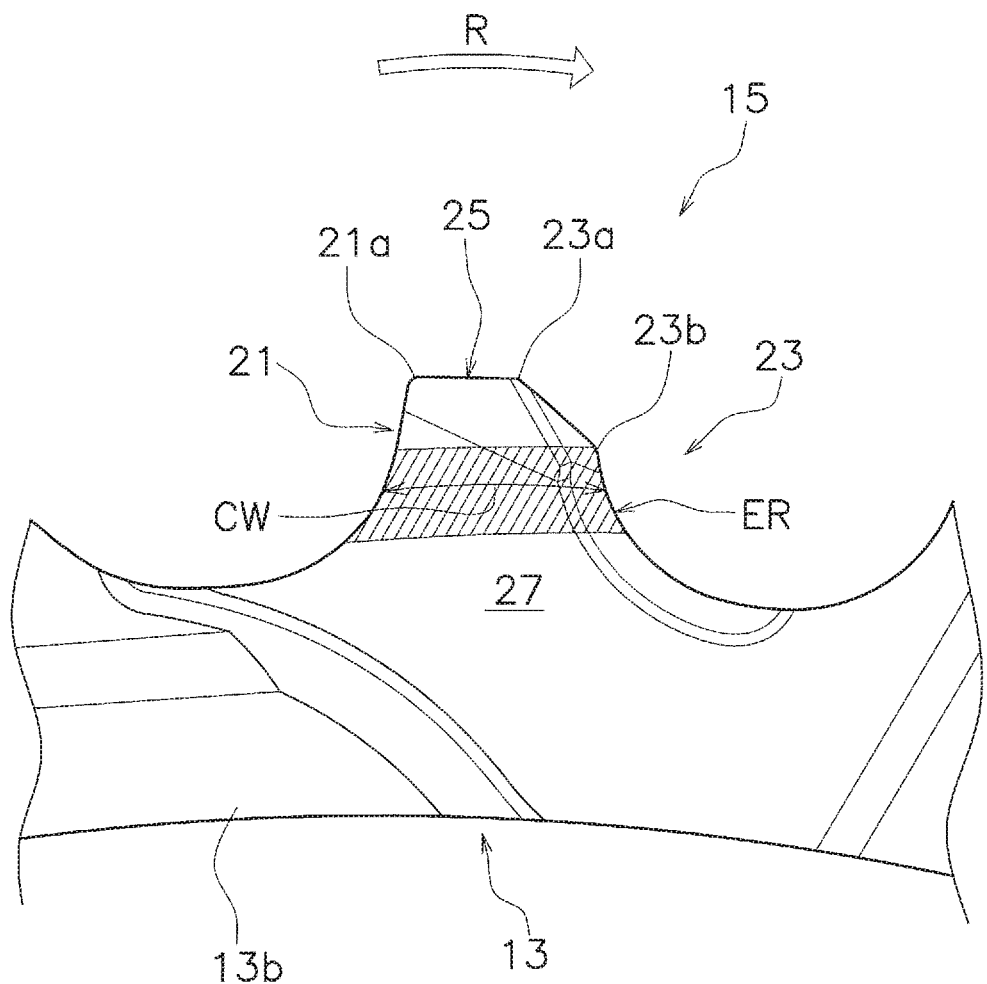
FIG. 7 is a partially enlarged non-frame facing side view of a first sprocket tooth of the rear sprocket illustrated in FIGS. 4 to 6.
Figure 8:
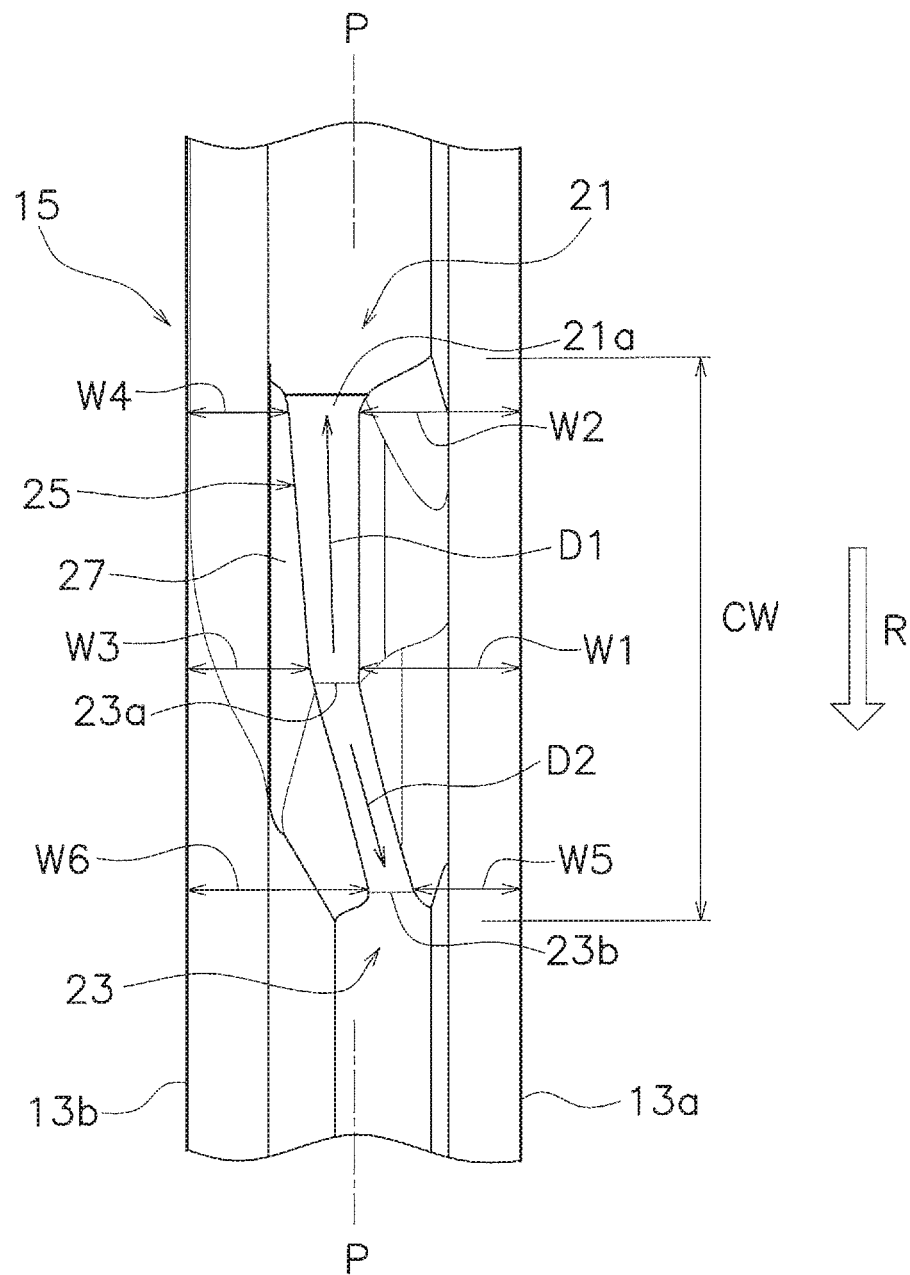
FIG. 8 is a partially enlarged edge view of the first sprocket tooth as viewed in a radial direction toward a rotational center axis of the rear sprocket illustrated in FIGS. 4 to 6.

As shown in FIGS. 7 and 8, with respect to the rotational center axis X, a circumferential chain engaging width CW of the at least one first sprocket tooth 15 is greater than at least one of a circumferential chain engaging width of the at least one shifting initiation tooth 17 or a circumferential chain engaging width of the at least one second sprocket tooth 19.

Preferably, as in the present embodiment, the circumferential chain engaging width CW of the at least one first sprocket tooth 15 is greater than the circumferential chain engaging width of the at least one shifting initiation tooth 17, and is greater than the circumferential chain engaging width of the at least one second sprocket tooth 19.

As shown in FIG. 7, the circumferential chain engaging width CW of the at least one first sprocket tooth 15 is defined by a substantial median of the circumferential widths measured in a region ER (a hatched region in FIG. 7) of the at least one first sprocket tooth 15. The at least one first sprocket tooth 15 is engaged at the region ER with link plates of the chain 2 as seen in the axial direction with respect to the rotational center axis X.

As shown in FIGS. 7 and 8, the at least one first sprocket tooth 15 includes a drive surface 21, a non-drive surface 23 and a tooth tip portion 25. A boundary between the drive surface 21 and the tooth tip portion 25 is defined by a drive surface side tooth tip end portion 21a. A boundary between the non-drive surface 23 and the tooth tip portion 25 is defined by a non-drive surface side tooth tip end portion 23a. The tooth tip portion 25 connects the drive surface side tooth tip end portion 21a and the non-drive surface side tooth tip end portion 23a. The at least one first sprocket tooth 15 further includes a recessed portion 27 that is formed on an axially facing side of the at least one first sprocket tooth 15 that faces in the same direction as the second surface 13b. The recessed portion 27 extends from the second surface 13b toward the first surface 13a.

In the present embodiment, as shown in FIGS. 5 and 6, the at least one first sprocket tooth 15 includes a plurality of (e.g., three) first sprocket teeth 15. Each of the first sprocket teeth 15 is provided on the outer peripheral part of the base body 13. Each of the first sprocket teeth 15 extends radially outwardly from the base body 13 with respect to the rotational center axis X. In the present embodiment, each of the first sprocket teeth 15 is disposed on an adjacently downstream side of each of the shifting initiation teeth 17 in the drive rotational direction R.

However, alternatively, each of the first sprocket tooth 15 can be separated from each of the at least one shifting initiation tooth 17 in the circumferential direction with respect to the rotational center axis X. In the present embodiment, each of the first sprocket teeth 15 is disposed within one of the shifting facilitation areas S, for instance, an upshifting facilitation area SA.

It should be noted that a configuration of the at least one shifting facilitation area S will be described below. However, each of the first sprocket teeth 15 can be disposed outside of the shifting facilitation areas S. All of the teeth other than the at least one shifting initiation tooth 17 can have the same configuration as the first sprocket teeth 15.

The circumferential chain engaging width CW of each of the first sprocket teeth 15 is greater than at least one of the circumferential chain engaging width of each of the shifting initiation teeth 17, or the circumferential chain engaging width of each of the second sprocket teeth 19. In the present embodiment, the circumferential chain engaging width CW of each of the first sprocket teeth 15 is greater than the circumferential chain engaging width of each of the shifting initiation teeth 17 and the circumferential chain engaging width of each of the second sprocket teeth 19.

Each of the first sprocket teeth 15 includes the drive surface 21, the non-drive surface 23 and the tooth tip portion 25, all of which have been described above. In the present embodiment, each of the first sprocket teeth 15 includes the recessed portion 27. However, when disposed in any other location, each of the first sprocket tooth 15 can be configured without the recessed portion 27. Here, the tooth tip portion 25 directly connects the drive surface side tooth tip end portion 21a and the non-drive surface side tooth tip end portion 23a. Also, here, the tooth tip portion 25 includes a flat surface that directly connects the drive surface side tooth tip end portion 21a and the non-drive surface side tooth tip end portion 23a. Alternatively, the tooth tip portion 25 can be provided between the drive surface side tooth tip end portion 21a and the non-drive surface side tooth tip end portion 23a so as to have a curvature.

The drive surface 21 is a surface to be driven by the chain. Specifically, the drive surface 21 is a surface with which one of chain rollers makes contact so as to transmit a driving force to the rear sprocket SP10. When the chain roller presses the drive surface 21 in the condition, the rear sprocket SP10 is rotated about the rotational center axis X in the drive rotational direction R. The drive surface 21 is located on the upstream side of the first sprocket tooth 15 with respect to the drive rotational direction R.

As shown in FIGS. 7 and 8, one end of the drive surface 21 is defined by the drive surface side tooth tip end portion 21a. The drive surface 21 is disposed to extend between the drive surface side tooth tip end portion 21a and the base body 13. Specifically, the drive surface 21 has a curved shape between the drive surface side tooth tip end portion 21a and the base body 13 so as to enable one of the chain rollers to make contact therewith.

As shown in FIG. 7, the drive surface side tooth tip end portion 21a is disposed radially outwardly from the base body 13 in the radial direction with respect to the rotational center axis X. For example, the drive surface side tooth tip end portion 21a is disposed on the radially outermost side in the drive surface 21.

As shown in FIG. 8, the drive surface side tooth tip end portion 21a is disposed upstream side of the non-drive surface side tooth tip end portion 23a in the drive rotational direction R. The drive surface side tooth tip end portion 21a is disposed closer to the second surface 13b than the non-drive surface side tooth tip end portion 23a in the axial direction with respect to the rotational center axis X. Specifically, the second surface 13b side of the drive surface side tooth tip end portion 21a is disposed closer to the second surface 13b than the second surface 13b side of the non-drive surface side tooth tip end portion 23a in the axial direction with respect to the rotational center axis X.

The non-drive surface 23 is a surface to which a driving force is not substantially transmitted by the chain. The non-drive surface 23 is located on the upstream side of the first sprocket tooth 15 with respect to the drive rotational direction R. As shown in FIGS. 7 and 8, the non-drive surface 23 includes the non-drive surface side tooth tip end portion 23a. Preferably, the non-drive surface 23 further includes a non-drive surface protrusion 23b. The non-drive surface 23 can be configured without the non-drive surface protrusion 23b.

As shown in FIG. 7, the non-drive surface 23 is disposed to extend between the non-drive surface side tooth tip end portion 23a and the base body 13. As shown in FIG. 8, the tooth tip portion 25 extends between the drive surface side tooth tip end portion 21a and the non-drive surface side tooth tip end portion 23a in a first direction D1, whereas the non-drive surface 23 extends from the non-drive surface side tooth tip end portion 23a in a second direction D2 that is inclined with respect to the first direction D1 in the axial direction. More specifically, the non-drive surface 23 extends circumferentially with respect to the rotational center axis X from the non-drive surface side tooth tip end portion 23a in the second direction D2 that is inclined with respect to the first direction D1 (i.e., the second direction D2 deviates in direction or course with respect to the first direction D1). In the present embodiment, the first direction D1 slightly intersects the circumferential direction with respect to the rotational center axis X as viewed in the radial direction toward the rotational center axis X. In other words, in the present embodiment, the first direction D1 is not parallel to the circumferential direction with respect to the rotational center axis X. Alternatively, the first direction D1 can be parallel to the circumferential direction with respect to the rotational center axis X. In either case, the first direction D1 primarily extends in the circumferential direction with respect to the rotational center axis X, but can extend slightly in the axial direction with respect to the rotational center axis X. In the present embodiment, the second direction D2 intersects the circumferential direction with respect to the rotational center axis X as viewed in the radial direction toward the rotational center axis X. In other words, in the present embodiment, the second direction D2 is not parallel to the circumferential direction with respect to the rotational center axis X. However, the second direction D2 primarily extends in the circumferential direction with respect to the rotational center axis X, but also partially extends in the axial direction with respect to the rotational center axis X.

Specifically, as shown in FIG. 8, the non-drive surface 23 extends circumferentially with respect to the rotational center axis X from the non-drive surface side tooth tip end portion 23a toward the first surface 13a. Specifically, the non-drive surface 23 extends toward the first surface 13a at least between the non-drive surface side tooth tip end portion 23a and the non-drive surface protrusion 23b in the circumferential direction with respect to the rotational center axis X. In the present embodiment, the non-drive surface 23 extends from the non-drive surface side tooth tip end portion 23a toward the non-drive surface protrusion 23b that is disposed closer to the first surface 13a than the non-drive surface side tooth tip end portion 23a.

The non-drive surface 23 can straightly extend from the non-drive surface side tooth tip end portion 23a toward the first surface 13a. Alternatively, the non-drive surface 23 can extend from the non-drive surface side tooth tip end portion 23a toward the first surface 13a so as to have a curvature.

As shown in FIGS. 7 and 8, in the circumferential direction with respect to the rotational center axis X, the non-drive surface side tooth tip end portion 23a is disposed on a downstream side of the drive surface side tooth tip end portion 21a in the drive rotational direction R. As shown in FIG. 7, the non-drive surface side tooth tip end portion 23a is disposed radially outwardly from the base body 13 in the radial direction with respect to the rotational center axis X. For example, the non-drive surface side tooth tip end portion 23a is disposed on the radially outermost side in the non-drive surface 23.

As shown in FIG. 8, the non-drive surface side tooth tip end portion 23a is disposed closer to the first surface 13a than the drive surface side tooth tip end portion 21a in the axial direction with respect to the rotational center axis X. Specifically, the first surface 13a side of the non-drive surface side tooth tip end portion 23a is disposed closer to the first surface 13a than the first surface 13a side of the drive surface side tooth tip end portion 21a in the axial direction with respect to the rotational center axis X.

Specifically, in the axial direction with respect to the rotational center axis X, a first interval W1 between the first surface 13a and the first surface 13a side surface of the non-drive surface side tooth tip end portion 23a is less than a second interval W2 between the first surface 13a and the first surface 13a side surface of the drive surface side tooth tip end portion 21a. In the present embodiment, the first interval W1 is 0.2 mm, whereas the second interval W2 is 0.55 mm. However, the value of the first interval W1 and that of the second interval W2 are not limited to these values.

In the axial direction with respect to the rotational center axis X, the first interval W1 is herein greater than a third interval W3 between the second surface 13b and the second surface 13b side surface of the non-drive surface side tooth tip end portion 23a. In the axial direction with respect to the rotational center axis X, the second interval W2 is greater than a fourth interval W4 between the second surface 13b and the second surface 13b side surface of the drive surface side tooth tip end portion 21a. The third interval W3 is greater than the fourth interval W4. In the present embodiment, the third interval W3 is 0.55 mm, whereas the fourth interval W4 is 0.45 mm. However, the value of the third interval W3 and that of the fourth interval W4 are not limited to these values.

As shown in FIGS. 7 and 8, in the circumferential direction with respect to the rotational center axis X, the non-drive surface protrusion 23b is disposed on a downstream side of the non-drive surface side tooth tip end portion 23a in the drive rotational direction R. As shown in FIG. 7, the non-drive surface protrusion 23b is provided between the non-drive surface side tooth tip end portion 23a and the base body 13 in the radial direction with respect to the rotational center axis X. In the present embodiment, the non-drive surface protrusion 23b is disposed radially inwardly from the non-drive surface side tooth tip end portion 23a.

In the present embodiment, the non-drive surface protrusion 23b is disposed radially inwardly from the non-drive surface side tooth tip end portion 23a by 1 mm or greater in the radial direction. Preferably, the non-drive surface protrusion 23b is disposed radially inwardly from the non-drive surface side tooth tip end portion 23a by a value falling in a range of greater than or equal to 1 mm and less than or equal to 3 mm in the radial direction.

As shown in FIG. 8, the non-drive surface protrusion 23b is disposed closer to the first surface 13a than the non-drive surface side tooth tip end portion 23a in the axial direction with respect to the rotational center axis X. Specifically, the first surface 13a side of the non-drive surface protrusion 23b is disposed closer to the first surface 13a than the first surface 13a side of the non-drive surface side tooth tip end portion 23a in the axial direction with respect to the rotational center axis X.

Specifically, in the axial direction with respect to the rotational center axis X, a fifth interval W5 between the first surface 13a and the first surface 13a side surface of the non-drive surface protrusion 23b is less than the first interval W1. In the axial direction with respect to the rotational center axis X, the fifth interval W5 is herein less than a sixth interval W6 between the second surface 13b and the second surface 13b side surface of the non-drive surface protrusion 23b. The sixth interval W6 is greater than the third interval W3. In the present embodiment, the fifth interval W5 is 0.2 mm, whereas the sixth interval W6 is 1 mm. However, in the present invention, the value of the fifth interval W5 and that of the sixth interval W6 are not limited to these values.

Preferably, as viewed in the radial direction toward the rotational center axis X, the non-drive surface protrusion 23b is disposed on the first surface 13a side with respect to a sprocket center plane P that divides the base body 13 into halves. Specifically, as viewed in the radial direction toward the rotational center axis X, at least part of the non-drive surface protrusion 23b is disposed between the first surface 13a and the sprocket center plane P that divides the base body 13 into halves. In the present embodiment, as viewed in the radial direction toward the rotational center axis X, the non-drive surface protrusion 23b is disposed between the first surface 13a and the sprocket center plane P that divides the base body 13 into halves.

As shown in FIG. 8, the tooth tip portion 25 extends between the drive surface side tooth tip end portion 21a and the non-drive surface side tooth tip end portion 23a in the first direction D1. In the present embodiment, the tooth tip portion 25 extends substantially along the circumferential direction with respect to the rotational center axis X, for instance, the sprocket center plane P that divides the base body 13 into halves.

As shown in FIG. 8, as viewed in the radial direction toward the rotational center axis X, the tooth tip portion 25 is at least partially disposed on the second surface 13b side with respect to the sprocket center plane P that divides the base body 13 into halves. As viewed in the radial direction toward the rotational center axis X, the tooth tip portion 25 is at least partially disposed on the opposite side of the non-drive surface protrusion 23b in the axial direction with respect to the sprocket center plane P that divides the base body 13 into halves.

In the present embodiment, as viewed in the radial direction toward the rotational center axis X, at least most of the tooth tip portion 25 is disposed on the second surface 13b side with respect to the sprocket center plane P that divides the base body 13 into halves. As viewed in the radial direction toward the rotational center axis X, at least most of the tooth tip portion 25 is disposed on the opposite side of the non-drive surface protrusion 23b in the axial direction with respect to the sprocket center plane P that divides the base body 13 into halves. In other words, as viewed in the radial direction toward the rotational center axis X, most of the tooth tip portion 25 is disposed between the sprocket center plane P and the second surface 13b.

The expression "most of the tooth tip portion 25" herein means that as the tooth tip portion 25 is viewed in the radial direction toward the rotational center axis X, "a partial area of the tooth tip portion 25 between the sprocket center plane P and the second surface 13b" is greater than or equal to 50% of "an entire area of the tooth tip portion 25".

It should be noted that "a partial area of the tooth tip portion 25 between the sprocket center plane P and the second surface 13b" is preferably greater than or equal to 70% of "an entire area of the tooth tip portion 25". Additionally, "a partial area of the tooth tip portion 25 between the sprocket center plane P and the second surface 13b" can be 100% of "an entire area of the tooth tip portion 25".

One of inner or outer links of the chain 2 is disposed on each of the recessed portions 27 in a shifting operation. Accordingly, in the shifting operation, the chain 2 can be preferably and appropriately guided from each first sprocket tooth 15 to the relevant shifting initiation tooth 17 thereof.

As shown in FIGS. 7 and 8, the recessed portion 27 is provided on the second surface 13b side in each first sprocket tooth 15. The recessed portion 27 is recessed from the second surface 13b toward the first surface 13a. The bottom portion of the recessed portion 27 extends from each of the first sprocket teeth 15 toward the second surface 13b of the base body 13. In other words, in the present embodiment, the recessed portion 27 is provided on each of the first sprocket teeth 15 and the base body 13.

As shown in FIGS. 5 and 6, the at least one shifting facilitation area S includes a plurality of (e.g., six) shifting facilitation areas S. In the present embodiment, the plurality of shifting facilitation areas S include a plurality of (e.g., three) upshifting facilitation area SA and a plurality of (e.g., three) downshifting facilitation area SB. However, the total number of the shifting facilitation areas S is not limited to that in the present embodiment.

The shifting facilitation areas S are herein areas intentionally designed to facilitate at least one of an upshifting operation and a downshifting operation. The upshifting operation is an operation in which the chain 2 shifts to the rear sprocket SP10 from the rear sprocket SP9, which has a small diameter and is disposed adjacently to the rear sprocket SP10, in the axial direction with respect to the rotational center axis X. On the other hand, the downshifting operation is an operation in which the chain 2 shifts from the rear sprocket SP10 to the rear sprocket SP9, which has a small diameter and is disposed adjacently to the rear sprocket SP10, in the axial direction with respect to the rotational center axis X.

Each upshifting facilitation area SA is a region to facilitate shifting of the chain to the rear sprocket SP10 from the rear sprocket SP9 that has a small diameter and is disposed adjacently to the rear sprocket SP10. The first sprocket tooth 15, first and second shifting initiation teeth 17a and 17b and a plurality of (e.g., two) second sprocket teeth 19 are disposed in each upshifting region.

In each of the upshifting facilitation areas SA, the respective sprocket teeth are disposed in alignment in the drive rotational direction R in the order of the upstream side second sprocket tooth 19, the second shifting initiation tooth 17b, the first shifting initiation tooth 17a, the first sprocket tooth 15 and the downstream side second sprocket tooth 19.

Each downshifting facilitation area SB is a region to facilitate shifting of the chain from the rear sprocket SP10 to the rear sprocket SP9 that has a small diameter and is disposed adjacently to the rear sprocket SP10. Third and fourth shifting initiation teeth 17c and 17d and a plurality of (e.g., three) second sprocket teeth 19 are disposed in each downshifting region.

In each downshifting facilitation area SB, the respective sprocket teeth are disposed in alignment in the drive rotational direction R in the order of the upstream side second sprocket tooth 19, the fourth shifting initiation tooth 17*d*, the third shifting initiation tooth 17*c* and two downstream side second sprocket teeth 19.

As shown in FIGS. 5 and 6, at least one shifting initiation tooth 17 is disposed within at least one of the shifting facilitation areas S. The at least one shifting initiation tooth 17 extends radially outwardly from the base body 13 and is different from the first sprocket teeth 15. In other words, the rear sprocket SP10, which is an exemplary bicycle sprocket, extends radially outwardly from the base body 13 and includes at least one shifting initiation tooth different from the at least one first sprocket tooth.

Here in the upshifting operation, when the chain 2 shifts to the rear sprocket SP10 from the rear sprocket SP9, which has a small diameter and is disposed adjacent to the rear sprocket SP10, in the axial direction with respect to the rotational center axis X, the shifting initiation tooth 17 is set as a tooth with which the chain 2 is firstly engaged among the sprocket teeth of the rear sprocket SP10. On the other hand, in the downshifting operation, when the chain 2 shifts from the rear sprocket SP10 to the rear sprocket SP9, which has a small diameter and is disposed adjacent to the rear sprocket SP10, in the axial direction with respect to the rotational center axis X, the shifting initiation tooth 17 is set a tooth from which the chain 2 is firstly disengaged among the sprocket teeth of the rear sprocket SP10.

The at least one shifting initiation tooth 17 includes a plurality of (e.g., twelve) shifting initiation teeth 17*a* to 17*d*. At least one of the shifting starting teeth 17*a* to 17*d* is disposed within each of the shifting facilitation areas S, for instance, each of the upshifting facilitation areas SA and each of the downshifting facilitation areas SB. Each of the shifting initiation teeth 17*a* to 17*d* extends radially outwardly from the base body 13. Each of the shifting initiation teeth 17 is different from each of the first sprocket teeth 15. Each of the shifting initiation teeth 17*a* to 17*d* is different from each of the second sprocket teeth 19.

As described above, one of the first shifting initiation teeth 17*a* and one of the second shifting initiation teeth 17*b* are disposed within each of the upshifting facilitation areas SA. Each of the first shifting initiation teeth 17*a* and each second shifting initiation teeth 17*b* are set as sprocket teeth with which the chain 2 is firstly meshed in the upshifting operation.

Each of the first shifting initiation tooth 17*a* is disposed on an adjacently upstream side of a corresponding one of the first sprocket teeth 15 in the drive rotational direction R. When the lateral surface of one inner link of the chain 2 makes contact with one of the first sprocket teeth 15 (e.g., the recessed portion 27) in the upshifting operation, the chain 2 is firstly meshed with the first shifting initiation tooth 17*a*.

Each of the second shifting initiation teeth 17*b* is disposed on an adjacently upstream side of a corresponding one of the first shifting initiation teeth 17*a* in the drive rotational direction R. In other words, each of the second shifting initiation teeth 17*b* is disposed adjacent to a corresponding one of the first shifting initiation teeth 17*a* in the circumferential direction with respect to the rotational center axis X. When the lateral surface of one outer link of the chain 2 makes contact with one of the first sprocket teeth 15 (e.g., the recessed portion 27) in the upshifting operation, the chain 2 is firstly meshed with one of the second shifting initiation teeth 17*b* without being engaged with a corresponding one of the first shifting initiation teeth 17*a*.

As described above, one of the third shifting initiation teeth 17*c* and one of the fourth shifting initiation teeth 17*d* are disposed within each of the downshifting facilitation areas SB. Each of the third shifting initiation teeth 17*c* and each of the fourth shifting initiation teeth 17*d* are set as sprocket teeth from which the chain 2 is firstly disengaged in the downshifting operation.

When the second sprocket tooth 19, which is disposed on the adjacently downstream side of a corresponding one of the third shifting initiation teeth 17*c*, is disposed between outer links of the chain 2 in the downshifting operation, the chain 2 is disengaged from each third shifting initiation tooth 17*c* toward a rear sprocket having a small diameter.

Each of the fourth shifting initiation teeth 17*d* is disposed on an adjacently upstream side of a corresponding one of the third shifting initiation teeth 17*c* in the drive rotational direction R. In other words, each of the fourth shifting initiation teeth 17*d* is disposed adjacent to a corresponding one of the third shifting initiation teeth 17*c* in the circumferential direction with respect to the rotational center axis X.

When the second sprocket tooth 19, which is disposed on an adjacently downstream side of a corresponding one of the third shifting initiation teeth 17*c*, is disposed between inner links of the chain 2 in the downshifting operation, the chain 2 is disengaged from each of the fourth shifting initiation teeth 17*d* toward the rear sprocket having a small diameter without being disengaged from each of the third shifting initiation teeth 17*c*.

As shown in FIGS. 5 and 6, the at least one second sprocket tooth 19 includes a plurality of (e.g., twenty-seven) second sprocket teeth 19. Each of second sprocket teeth 19 is different from each of the first sprocket teeth 15 and each of the shifting initiation teeth 17*a* to 17*d*.

Each of the second sprocket teeth 19 is provided on the outer peripheral part of the base body 13. Each of the second sprocket teeth 19 extends radially outwardly from the base body 13 in the radial direction with respect to the rotational center axis X. The second sprocket teeth 19 can be disposed within the upshifting facilitation areas SA and the downshifting facilitation areas SB and outside the shifting facilitation areas S, respectively.

Other Embodiments

One embodiment has been explained above. However, the present invention is not limited to the above embodiment, and a variety of changes can be made without departing from the gist of the present invention. Especially, embodiments described in the present specification can be arbitrarily combined on an as-needed basis.

In the aforementioned embodiment, a configuration has been explained with the single rear sprocket SP10. However, the aforementioned configuration of the rear sprocket SP10 is applicable to each of the rear sprockets SP1-SP9, SP11 and SP12.

The aforementioned embodiment has exemplified the case that the aforementioned configuration is applied to the rear sprocket SP10. However, the aforementioned configuration is also applicable to the front sprocket. The front sprocket including the aforementioned configuration can include a crank arm attaching portion having, for instance, a bolt hole and/or so forth. Alternatively, the front sprocket including the aforementioned configuration can include a crank arm engaging portion or a crank axle engaging portion, which has, for instance, at least one spline and/or so forth.

Furthermore, the front sprocket including the aforementioned configuration can include at least one upshifting facilitation protruding portion that facilitates the chain to be engaged with the at least one shifting initiation tooth in the upshifting operation. The at least one upshifting facilitation protruding portion protrudes in the axial direction with respect to the rotational center axis X, and is disposed in the vicinity of the at least one shifting initiation tooth. The at least one upshifting facilitation protruding portion is configured to be engaged with the chain earlier than the at least one shifting initiation tooth in the upshifting operation so as to facilitate the chain to be engaged with the at least one shifting initiation tooth.

The aforementioned configuration is applicable not only to a bicycle rear sprocket assembly having a plurality of rear sprockets provided as separate members but also to a bicycle rear sprocket assembly in which part or all of a plurality of rear sprockets are integrally configured. The expression "integrally configured" herein encompasses a configuration to form a single material by cutting, forging, bending or so forth and a configuration to integrate a plurality of separate members by rivets, bolts, adhesive and/or so forth.

The aforementioned configuration is applicable not only to a sprocket made of only a metallic material but also to a sprocket composed of a composite material in which a tooth portion is made of metal whereas the base body is made of a nonmetallic material.

In the aforementioned embodiment, the rear sprocket SP10 includes both the upshifting facilitation areas SA and the downshifting facilitation areas SB, but alternatively, can include only one of them. For example, the rear sprocket SP10 can include only the upshifting facilitation areas SA.

What is claimed is:

1. A bicycle sprocket comprising:
   a base body including a rotational center axis, a first surface and a second surface that is disposed on an opposite side of the first surface in an axial direction with respect to the rotational center axis;
   at least one first sprocket tooth extending radially outwardly from the base body in a radial direction with respect to the rotational center axis; and
   at least one shifting initiation tooth extending radially outwardly from the base body in the radial direction, the at least one shifting initiation tooth being different from the at least one first sprocket tooth,
   the at least one first sprocket tooth including a drive surface, a non-drive surface and a tooth tip portion,
   the at least one first sprocket tooth further including a boundary between the drive surface and the tooth tip portion being defined by a drive surface side tooth tip end portion, and a boundary between the non-drive surface and the tooth tip portion being defined by a non-drive surface side tooth tip end portion,
   the tooth tip portion connecting the drive surface side tooth tip end portion and the non-drive surface side tooth tip end portion,
   the non-drive surface extending circumferentially with respect to the rotational center axis from the non-drive surface side tooth tip end portion at least partially toward the first surface,
   the tooth tip portion extending circumferentially with respect to the rotational center axis in a first direction between the drive surface side tooth tip end portion and the non-drive surface side tooth tip end portion, and
   the non-drive surface extending circumferentially with respect to the rotational center axis from the non-drive surface side tooth tip end portion in a second direction that is inclined with respect to the first direction in the axial direction.

2. The bicycle sprocket according to claim 1, wherein the first surface is a center plane facing surface that faces a bicycle center plane of a bicycle in a state in which the base body is attached to the bicycle.

3. The bicycle sprocket according to claim 1, wherein the at least one first sprocket tooth includes a plurality of first sprocket teeth.

4. The bicycle sprocket according to claim 1, wherein the non-drive surface includes a non-drive surface protrusion, the non-drive surface extending circumferentially toward the first surface at least between the non-drive surface side tooth tip end portion and the non-drive surface protrusion.

5. The bicycle sprocket according to claim 4, wherein the non-drive surface protrusion is disposed radially inwardly from the non-drive surface side tooth tip end portion in the radial direction.

6. The bicycle sprocket according to claim 5, wherein the non-drive surface protrusion is disposed radially inwardly from the non-drive surface side tooth tip end portion by 1 mm or greater in the radial direction.

7. The bicycle sprocket according to claim 4, wherein the tooth tip portion is at least partially disposed on an opposite side of a sprocket center plane from the non-drive surface protrusion with respect to the axial direction, the sprocket center plane dividing the base body into halves as viewed in the radial direction toward the rotational center axis.

8. The bicycle sprocket according to claim 7, wherein at least most of the tooth tip portion is disposed on the opposite side of the sprocket center plane from the non-drive surface protrusion.

9. The bicycle sprocket according to claim 4, wherein the non-drive surface protrusion is disposed on a first surface side with respect to a sprocket center plane dividing the base body into halves as viewed in the radial direction toward the rotational center axis, and the tooth tip portion is at least partially disposed on a second surface side with respect to the sprocket center plane as viewed in the radial direction toward the rotational center axis.

10. The bicycle sprocket according to claim 9, wherein the non-drive surface protrusion is disposed on the first surface side with respect to the sprocket center plane, and most of the tooth tip portion is disposed on the second surface side with respect to the sprocket center plane.

11. The bicycle sprocket according to claim 1, wherein the drive surface side tooth tip end portion is disposed closer to the second surface than the non-drive surface side tooth tip end portion in the axial direction.

12. The bicycle sprocket according to claim 4, wherein the non-drive surface side tooth tip end portion is disposed closer to the second surface than the non-drive surface protrusion in the axial direction.

13. The bicycle sprocket according to claim 1, further comprising:
   at least one shifting facilitation area,
   the at least one first sprocket tooth and the at least one shifting initiation tooth being disposed within the at least one shifting facilitation area.

14. The bicycle sprocket according to claim 1, wherein the at least one first sprocket tooth is disposed on an adjacently downstream side of the at least one shifting initiation tooth in a drive rotational direction.

15. The bicycle sprocket according to claim 1, wherein the at least one first sprocket tooth includes a recessed portion formed from the second surface toward the first surface.

16. The bicycle sprocket according to claim 1, wherein the at least one shifting initiation tooth includes a plurality of shifting initiation teeth.

17. The bicycle sprocket according to claim 13, wherein the at least one shifting facilitation area includes a plurality of shifting facilitation areas.

18. The bicycle sprocket according to claim 1, wherein a total number of teeth is greater than or equal to 16.

19. The bicycle sprocket according to claim 1, wherein the base body further includes a bicycle hub engaging portion.

20. The bicycle sprocket according to claim 1, further comprising:
at least one second sprocket tooth different from the at least one first sprocket tooth and the at least one shifting initiation tooth,
the at least one first sprocket tooth having a circumferential chain engaging width greater than a circumferential chain engaging width of the at least one shifting initiation tooth or a circumferential chain engaging width of the at least one second sprocket tooth, or greater than both the circumferential chain engaging width of the at least one shifting initiation tooth and the circumferential chain engaging width of the at least one second sprocket tooth.

21. A bicycle sprocket assembly comprising the at least one bicycle sprocket according to claim 1, the bicycle sprocket assembly further comprising:
a sprocket support member to which the at least one bicycle sprocket is attached.

22. The bicycle sprocket assembly according to claim 21, wherein
the sprocket support member includes a bicycle hub engaging portion.

23. A bicycle sprocket comprising:
a base body including a rotational center axis, a first surface and a second surface that is disposed on an opposite side of the first surface in an axial direction with respect to the rotational center axis;
at least one first sprocket tooth extending radially outwardly from the base body in a radial direction with respect to the rotational center axis; and
at least one shifting initiation tooth extending radially outwardly from the base body in the radial direction, the at least one shifting initiation tooth being different from the at least one first sprocket tooth,
the at least one first sprocket tooth including a drive surface, a non-drive surface and a tooth tip portion,
the at least one first sprocket tooth further including a boundary between the drive surface and the tooth tip portion being defined by a drive surface side tooth tip end portion, and a boundary between the non-drive surface and the tooth tip portion being defined by a non-drive surface side tooth tip end portion,
the tooth tip portion connecting the drive surface side tooth tip end portion and the non-drive surface side tooth tip end portion,
the non-drive surface including a non-drive surface protrusion,
the non-drive surface extending circumferentially with respect to the rotational center axis toward the first surface at least between the non-drive surface side tooth tip end portion and the non-drive surface protrusion,
the non-drive surface protrusion being disposed radially inwardly from the non-drive surface side tooth tip end portion in the radial direction, and
the tooth tip portion and the non-drive surface side tooth tip end portion each being at least partially disposed on an opposite side of a sprocket center plane from the non-drive surface protrusion with respect to the axial direction, the sprocket center plane dividing the base body into halves as viewed in the radial direction toward the rotational center axis.

24. The bicycle sprocket according to claim 23, wherein at least most of the tooth tip portion is disposed on the opposite side of the sprocket center plane from the non-drive surface protrusion.

25. The bicycle sprocket according to claim 23, further comprising:
at least one second sprocket tooth different from the at least one first sprocket tooth,
the at least one first sprocket tooth having a circumferential chain engaging width greater than a circumferential chain engaging width of the at least one shifting initiation tooth or a circumferential chain engaging width of the at least one second sprocket tooth, or greater than both the circumferential chain engaging width of the at least one shifting initiation tooth and the circumferential chain engaging width of the at least one second sprocket tooth.

26. The bicycle sprocket according to claim 23, wherein
the tooth tip portion extends circumferentially with respect to the rotational center axis in a first direction between the drive surface side tooth tip end portion and the non-drive surface side tooth tip end portion, and
the non-drive surface extends circumferentially with respect to the rotational center axis from the non-drive surface side tooth tip end portion in a second direction that is inclined with respect to the first direction in the axial direction.

27. The bicycle sprocket according to claim 23, wherein the first surface is a center plane facing surface that faces a bicycle center plane of a bicycle in a state in which the base body is attached to the bicycle.

28. A bicycle sprocket comprising:
a base body including a rotational center axis, a first surface and a second surface that is disposed on an opposite side of the first surface in an axial direction with respect to the rotational center axis;
at least one first sprocket tooth extending radially outwardly from the base body in a radial direction with respect to the rotational center axis; and
at least one shifting initiation tooth extending radially outwardly from the base body in the radial direction, the at least one shifting initiation tooth being different from the at least one first sprocket tooth,
the at least one first sprocket tooth including a drive surface, a non-drive surface and a tooth tip portion,
the at least one first sprocket tooth further including a boundary between the drive surface and the tooth tip portion being defined by a drive surface side tooth tip end portion, and a boundary between the non-drive surface and the tooth tip portion being defined by a non-drive surface side tooth tip end portion,
the tooth tip portion connecting the drive surface side tooth tip end portion and the non-drive surface side tooth tip end portion, the non-drive surface including a non-drive surface protrusion, the non-drive surface extending circumferentially with respect to the rotational center axis toward the first surface at least between the non-drive surface side tooth tip end portion and the non-drive surface protrusion, the non-drive surface protrusion being disposed radially inwardly from the non-drive surface side tooth tip end portion in the radial direction, the tooth tip portion being at least partially disposed on an opposite side of a sprocket center plane from the non-drive surface protrusion with respect to the axial direction, the sprocket center plane dividing the base body into halves as viewed in the radial direction toward the rotational center axis, and at least most of the tooth tip portion is disposed on the opposite side of the sprocket center plane from the non-drive surface protrusion.

29. A bicycle sprocket comprising:

a base body including a rotational center axis, a first surface and a second surface that is disposed on an opposite side of the first surface in an axial direction with respect to the rotational center axis;

at least one first sprocket tooth extending radially outwardly from the base body in a radial direction with respect to the rotational center axis; and at least one shifting initiation tooth extending radially outwardly from the base body in the radial direction, the at least one shifting initiation tooth being different from the at least one first sprocket tooth, the at least one first sprocket tooth including a drive surface, a non-drive surface and a tooth tip portion, the at least one first sprocket tooth further including a boundary between the drive surface and the tooth tip portion being defined by a drive surface side tooth tip end portion, and a boundary between the non-drive surface and the tooth tip portion being defined by a non-drive surface side tooth tip end portion, the tooth tip portion connecting the drive surface side tooth tip end portion and the non-drive surface side tooth tip end portion, the non-drive surface including a non-drive surface protrusion, the non-drive surface extending circumferentially with respect to the rotational center axis toward the first surface at least between the non-drive surface side tooth tip end portion and the non-drive surface protrusion, the non-drive surface protrusion being disposed radially inwardly from the non-drive surface side tooth tip end portion in the radial direction, the tooth tip portion being at least partially disposed on an opposite side of a sprocket center plane from the non-drive surface protrusion with respect to the axial direction, the sprocket center plane dividing the base body into halves as viewed in the radial direction toward the rotational center axis, the tooth tip portion extending circumferentially with respect to the rotational center axis in a first direction between the drive surface side tooth tip end portion and the non-drive surface side tooth tip end portion, and the non-drive surface extending circumferentially with respect to the rotational center axis from the non-drive surface side tooth tip end portion in a second direction that is inclined with respect to the first direction in the axial direction.

* * * * *